(12) United States Patent
Lymberopoulos (10) Patent No.: US 7,677,526 B2
(45) Date of Patent: *Mar. 16, 2010

(54) MECHANICAL OVERRIDE FOR A VALVE ACTUATOR

(75) Inventor: David Lymberopoulos, Houston, TX (US)

(73) Assignee: Safoco, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,310

(22) Filed: Nov. 13, 2007

(65) Prior Publication Data

US 2008/0067460 A1    Mar. 20, 2008

Related U.S. Application Data

(63) Continuation of application No. 11/364,840, filed on Feb. 28, 2006, now Pat. No. 7,293,575, which is a continuation of application No. 10/694,618, filed on Oct. 27, 2003, now Pat. No. 7,004,445.

(51) Int. Cl.
F16K 31/145 (2006.01)
F16K 17/38 (2006.01)

(52) U.S. Cl. .............................. 251/14; 137/75; 137/77
(58) Field of Classification Search .................. 251/14, 251/129.03, 264, 276, 278; 137/75, 77
See application file for complete search history.

(56) References Cited

U.S. PATENT DOCUMENTS

| | | | |
|---|---|---|---|
| 1,722,754 A * | 7/1929 | Knauf | ......................... 251/278 |
| 2,035,497 A | 3/1936 | Morse | |
| 2,137,685 A | 11/1938 | Gillen | |
| 2,997,052 A | 8/1961 | Mangini | |
| 3,378,224 A | 4/1968 | Boyle | |
| 3,679,169 A * | 7/1972 | Bedo et al. | ................... 251/264 |
| 3,842,854 A | 10/1974 | Wickle | |

(Continued)

FOREIGN PATENT DOCUMENTS

GB     2080496     2/1982

(Continued)

OTHER PUBLICATIONS

Axelson Condensed Catalog, Catalog AD-241, pp. 1-10 and 15-24, 1988, U.S.A.

(Continued)

*Primary Examiner*—John Rivell
(74) *Attorney, Agent, or Firm*—Patterson & Sheridan, LLP (57) ABSTRACT

An apparatus and method for manual operation of an actuator is disclosed. A mechanical override includes a housing coupled to the actuator, a drive ring, and a shaft extending through a bore of the housing. The drive ring rotationally keys to the bore such that the drive ring is capable of axial movement within the bore in response to automatic operation of the actuator. A backstop limits axial movement of the drive ring during manual operation. A thread located on an external portion of the shaft threads to the drive ring. In the manual operation, the shaft rotates through the drive ring imparting axial movement to the shaft capable of moving a valve between a first position and a second position. The override provides visual indication of the valve position during both automatic and manual operation. The backstop may be an insert that selectively permits movement of the shaft to a failsafe position in response to a temperature or pressure change.

11 Claims, 8 Drawing Sheets

U.S. PATENT DOCUMENTS

| | | | | |
|---|---|---|---|---|
| 3,889,922 A | * | 6/1975 | Peters | 251/14 |
| 3,958,592 A | | 5/1976 | Wells et al. | |
| 4,213,480 A | | 7/1980 | Orum et al. | |
| 4,240,455 A | | 12/1980 | McGee | |
| 4,414,995 A | | 11/1983 | Spencer | |
| 4,436,279 A | * | 3/1984 | Bonds et al. | 251/14 |
| 4,569,503 A | * | 2/1986 | Karr, Jr. | 251/14 |
| 4,619,434 A | | 10/1986 | Snyder et al. | |
| 4,650,151 A | * | 3/1987 | McIntyre | 251/14 |
| 4,827,963 A | | 5/1989 | Baker et al. | |
| 4,921,207 A | * | 5/1990 | Baker | 251/14 |
| 4,967,785 A | | 11/1990 | Young | |
| 5,067,510 A | | 11/1991 | Breaux et al. | |
| 5,080,125 A | | 1/1992 | Boski | |
| 6,250,605 B1 | | 6/2001 | Young | |
| 6,401,747 B1 | | 6/2002 | Cain et al. | |
| 6,854,704 B1 | * | 2/2005 | Young | 251/14 |
| 7,004,445 B2 | | 2/2006 | Lymberopoulos | |
| 7,293,575 B2 | | 11/2007 | Lymberopoulos | |

OTHER PUBLICATIONS

WellGuard PWG-10 Pneumatic Piston Actuator With Internal Override, Emerson Process Management, Bettis Bulletin, #49.30, Rev: 0/02, pp. 1-6, 2002.

* cited by examiner

MECHANICAL OVERRIDE FOR A VALVE ACTUATOR

CROSS-REFERENCE TO RELATED APPLICATIONS

This application is a continuation of U.S. patent application Ser. No. 11/364,840, filed Feb. 28, 2006, now U.S. Pat. No. 7,293,575, which is a continuation of U.S. patent application Ser. No. 10/694,618, filed Oct. 27, 2003, now U.S. Pat. No. 7,004,445. The aforementioned related patent applications are herein incorporated by reference in their entirety.

BACKGROUND OF THE INVENTION

1. Field of the Invention

Embodiments of the invention generally relate to a valve actuator. More particularly, embodiments of the present invention relate to a mechanical override for a valve actuator.

2. Description of the Related Art

Various designs of valve actuators exist that operate to open and close valves in a variety of uses. The petroleum industry utilizes these actuators to operate gate valves that incorporate a sliding gate within a valve body to selectively block fluid flow through tubing. Positioning gate valves along tubing at various locations controls and directs the flow of fluids through the tubing. An assembly known as a Christmas tree includes these valves along with spools, pressure gauges, fittings, and/or chokes connected to the top of a well in order to direct and control the flow of formation fluids or production fluids from the well.

In operation, a valve stem extending from the valve body of the gate valve moves axially within the valve body in order to move the sliding gate between an open position and a closed position. A shaft within the actuator for the gate valve engages the valve stem to impart the axial movement to the valve stem. Typically, the actuator includes a spring to bias the shaft within the actuator such that the gate valve provides a failsafe to the closed position. In this manner, force applied to the shaft of the actuator from either a hydraulic, pneumatic, or mechanical source, depending on the type of actuator, overcomes the bias of the spring to move the sliding gate to the open position. Other gate valve designs provide for the failsafe in the open position or a fail-in-position which maintains the position of the sliding gate upon failure. If the shaft or a top shaft coupled to the shaft extends external to the actuator, the amount of the shaft extending from the actuator serves as a visual indication as to whether the valve is in the open position or the closed position.

The actuators commonly used to open and close the gate valves include manual actuators that use a mechanical force, automatic actuators such as various designs of pneumatic or hydraulic actuators, or combination actuators having both manual and automatic operation. Since most automatic operations of the actuators have a maximum capability for applying force to the valve stem, the combination actuator permits additional opening/closing power on a temporary basis without having to remove the original automatic actuator. Inadvertent loss of pneumatic or hydraulic pressure to the automatic actuator closes the gate valve which can interrupt production and interfere with wellbore completion operations occurring through the valve. The combination actuator provides a back-up for automatic operation, allows for testing, and enables an operator to lock the valve in the open position during various wellbore completion operations.

The shaft extending outside of the actuator provides the ability to lock open the valve with the use of a cap. Originally, the cap was a solid cap threaded to an exterior portion of the actuator such that the cap interfered with the axial movement of the actuator's shaft in order to hold the valve in the open position. However, the solid cap overrides the failsafe to the closed position. A fusible portion in a bore of the cap was added so that the fusible portion in the event of a fire burns out and permits the shaft to travel axially through the bore of the cap. While the fusible portion solves safety concerns in the event of fire, the cap still prevents automatic operation of an automatic actuator without removing the cap. Thus, the cap defeats the purpose of paying for and having the benefits of the automatic operation provided by the automatic actuator. Further, the valve must be forced into the open position before the cap can be installed on the outside of the actuator.

One type of combination actuator couples an auxiliary accessory or mechanical override such as a manual handwheel assembly to an exterior portion of an automatic actuator. The handwheel assembly couples to the combination actuator and mechanically forces the shaft of the actuator axially against the bias of the actuator's spring. Typically, the handwheel assembly includes an internally threaded bore that a threaded shaft threads into and contacts the shaft of the actuator. Thus, rotation of the threaded shaft axial moves the threaded shaft through the threaded bore and transposes movement to the shaft of the actuator. However, this type of handwheel assembly overrides the failsafe of the actuator similar to the cap. Additionally, the only visual indication of the position of the valve occurs when the threaded shaft of the handwheel assembly is rotated inward to overcome the bias of the actuator spring since the threaded shaft must be extended fully outward in order to allow for the automatic operation of the actuator. Thus, there is no visual indication of the position of the sliding gate during automatic operation. Furthermore, thieves easily remove the auxiliary accessories such as the handwheel assembly since the accessories thread to the exterior of the actuator.

A second type of combination actuator having an integral mechanical override includes an elongated exteriorly threaded valve stem of the gate valve that threads into an elongated internally threaded bore in the shaft of the actuator. In this manner, the mechanical override is integral with the actuator unlike the auxiliary accessories that attach to the exterior of the actuator. The shaft of the actuator extends through the actuator to an outside of the actuator where a handwheel attaches to the shaft for applying rotation to the shaft. Thus, manual rotation of the shaft provides relative axial movement between the shaft of the actuator and the valve stem due to mechanical threading/unthreading of the valve stem within the threaded bore of the shaft. Since the shaft of the actuator remains axially stationary, the relative axial movement provided by the manual operation moves the sliding gate between the open position and the closed position. In an automatic operation, the entire shaft of the actuator axially moves in order to move the sliding gate between the open position and the closed position. The position of the actuator's shaft remains the same for the automatic operation in a non-actuated position and any position of the manual operation of the actuator. Thus, there is no visual indication as to the position of the sliding gate unless the actuator is in an actuated position during automatic operation. Additionally, the integral mechanical override overrides the failsafe of the actuator similar to the cap and the handwheel assembly.

There are further problems associated with current integral mechanical overrides. The valve stem has a small diameter due to size constraints of the valve body and the actuator. The small diameter of the valve stem along with V-threads on the threaded valve stem and bore, make the shaft difficult to rotate. Thus, current integral mechanical overrides allow well fluids and thereby debris to enter the thread area of the valve stem and bore in order to pressure assist the rotation of the shaft during the manual operation. This fouls the threads and reduces the safety of the actuator since well fluids enter portions of the actuator. To further ease rotation of the shaft, the threaded bore and the valve stem have a large number of threads per inch, thereby requiring more manual work to manually operate the actuator. Additionally, the threaded valve stem and the bore must be elongated since the diameter of the valve stem is small and the V-threads do not function well under loads. The elongation takes up valuable space in the actuator.

Thus, there exists a need for an improved mechanical override for use with an actuator for a valve. There exists a further need for a mechanical override that provides a visual indication of the position of the valve, permits the actuator to maintain a failsafe position, improves and isolates a drive thread of the mechanical override from well fluid, and couples integrally with the actuator.

SUMMARY OF THE INVENTION

The present invention generally relates to a mechanical override for use with an actuator. The mechanical override includes a housing coupled to the actuator, a drive ring, and a shaft extending through a bore of the housing. The drive ring rotationally keys to the bore such that the drive ring is capable of axial movement within the bore in response to automatic operation of the actuator. A backstop limits axial movement of the drive ring during manual operation. A thread located on an external portion of the shaft threads to the drive ring. In the manual operation, the shaft rotates through the drive ring imparting axial movement to the shaft capable of moving a valve between a first position and a second position. The mechanical override provides visual indication of the valve position during both automatic and manual operation. The backstop may be an insert that selectively permits movement of the shaft to a failsafe position in response to a temperature or pressure change.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1A:
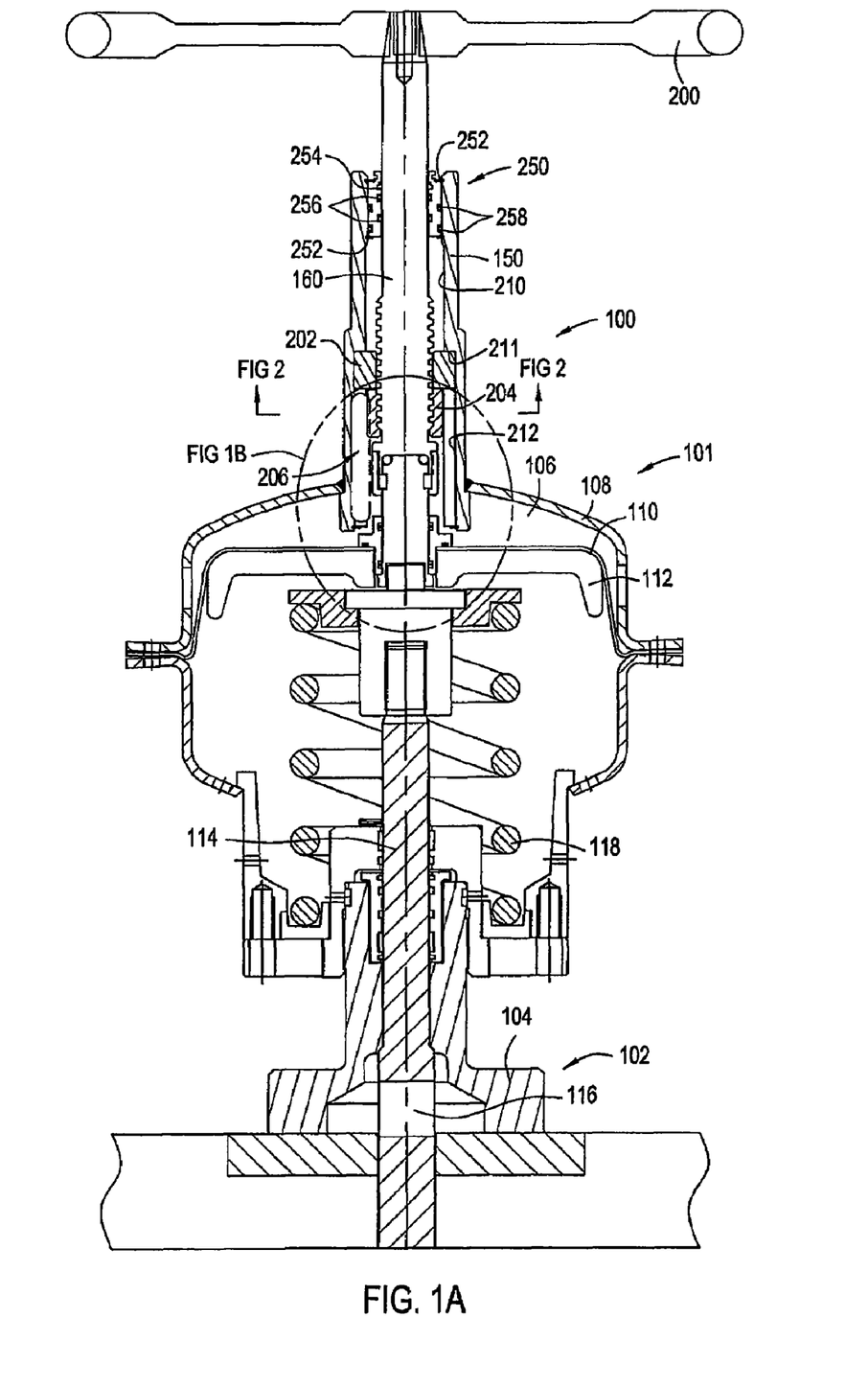
FIG. 1A is a sectional view of a gate valve coupled to an actuator having a mechanical override.
Figure 3:
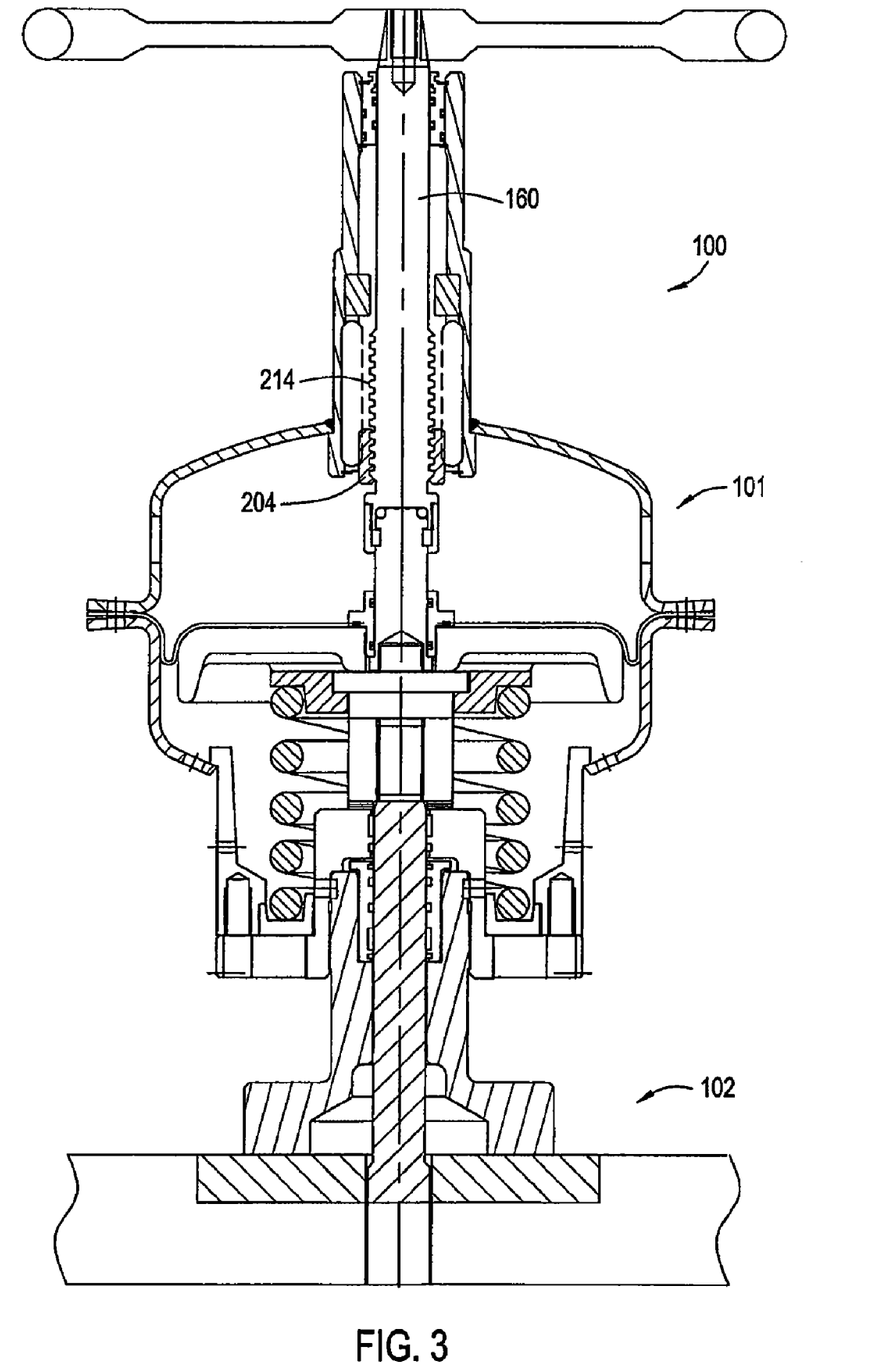
FIG. 3 is a sectional view of the gate valve in an open position after an automatic operation of the actuator.

FIG. 1A is a sectional view of a mechanical override 100, an actuator 101, and a gate valve 102. The actuator 101 couples to a valve body 104 of the gate valve 102. A bonnet assembly (not shown) can provide an interface between the gate valve 102 and the actuator 101. During an automatic operation of the gate valve 102, hydraulic or pneumatic pressure enters a space 106 of the actuator 101 defined by a cover 108 of the actuator 101 and a diaphragm 110 positioned over an operator member 112. The operator member 112 moves in response to the hydraulic or pneumatic pressure within the space 106 and a biasing force supplied by a spring 118. A valve stem 114 coupled to a sliding gate 116 of the gate valve 102 moves in response to the movement of the operator member 112. In this manner, the automatic operation of the actuator 101 moves the sliding gate 116 of the gate valve 102 between a closed position shown in FIG. 1A and an open position as shown in FIG. 3. The actuator 101 shown in FIG. 1A illustrates an exemplary actuator. However, the actual design and method of the automatic operation of the actuator 101 is not important to the mechanical override 100 described herein. In a preferred embodiment, the actuator 101 is selected from the pneumatic and hydraulic actuators described in detail in U.S. Pat. No. 6,450,477 which is herein incorporated by reference in its entirety. However, the actuator 101 can be selected from any other actuator known in the industry for moving the sliding gate 116 of the gate valve 102 between the open and closed positions by automatic operation.

Figure 1B:
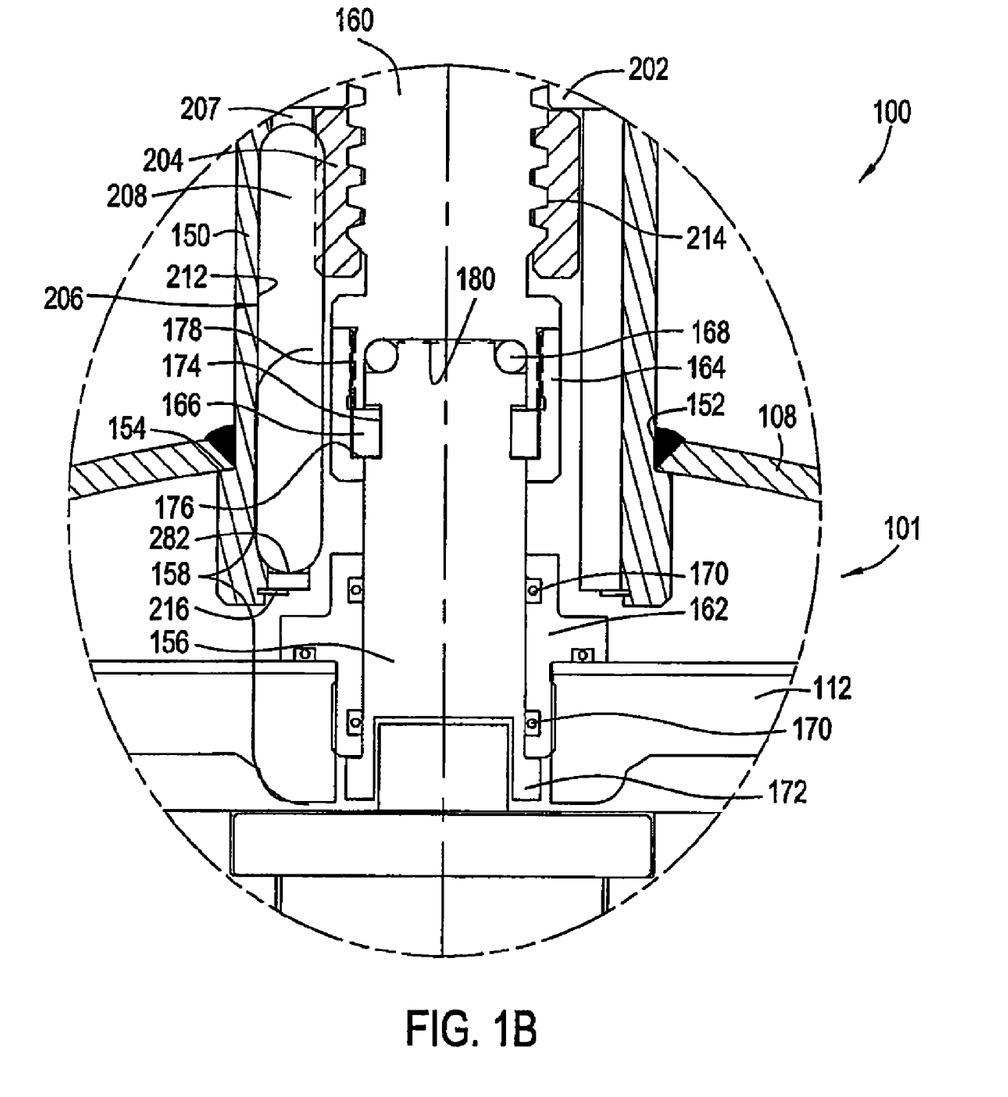
FIG. 1B is an enlarged view of a portion of the mechanical override in FIG. 1A.

The mechanical override 100 couples to the actuator 101 to provide a manual operation for moving the sliding gate 116 between the open and closed positions. As shown in FIG. 1B, an outer housing 150 of the mechanical override 100 passes through a top aperture 152 in the cover 108 of the actuator 101. A shoulder 154 formed by a portion of the housing 150 with an increased outer diameter provides a stop for positioning the housing 150 in the aperture 152 of the cover 108. The outer housing 150 secures to the cover 108 by any known means such as a thread or by welding.

The mechanical override 100 includes a lever for manual rotation of a top shaft 160 such as a handwheel 200, the outer housing 150 having a longitudinal bore therethrough, an insert or failsafe ring 202 disposed in the longitudinal bore, and a drive ring 204 rotationally locked by a rotational locking assembly 206. The longitudinal bore of the housing 150 includes a top bore 210 having a smaller inside diameter than a bottom bore 212. The failsafe ring 202 contacts a shoulder 211 formed by the interface between the top bore 210 and the bottom bore 212. A retainer ring 216 secures both the failsafe ring 202 and the rotational locking assembly 206 that is located below the failsafe ring 202 in the bottom bore 212 of the outer housing 150.

Figure 2:
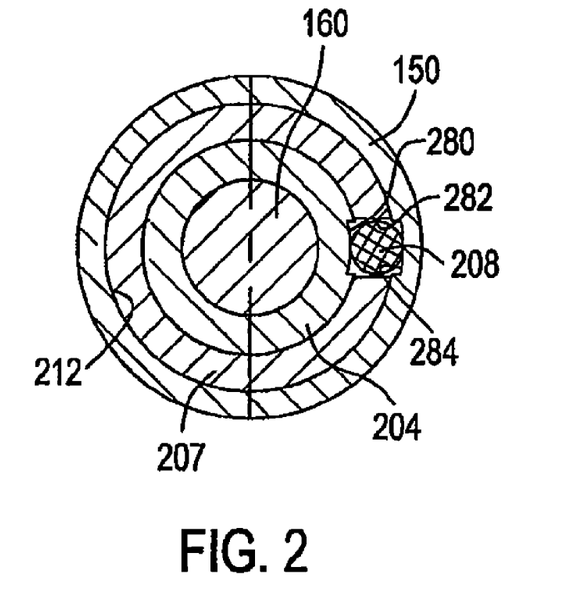
FIG. 2 is a cross sectional view of the mechanical override along section line 2-2 in FIG. 1A.

The drive ring 204 includes a threaded bore corresponding to a drive thread 214 on an outside surface of the top shaft 160. Any known rotational locking assembly prevents rotation of the drive ring 204 while permitting the drive ring 204 and the top shaft 160 to move axially within the longitudinal bore of the housing 150 during the automatic operation of the actuator 101. As shown, the rotational locking assembly 206 includes an inner sleeve 207 and an elongated pin member 208. FIG. 2 provides a cross sectional view of the mechanical override 100 that illustrates the pin member 208 disposed within a slot 282 formed in a wall of the inner sleeve 207. The pin member 208 extends on either side of the inner sleeve 207 to at least partially fill both a longitudinal recess 284 along the inside surface of the lower bore 212 of the housing 150 and a profile 280 along the outside length of the drive ring 204. Thus, the pin member 208 provides a physical interference as shown in FIG. 2 that rotationally locks the drive ring 204 to the housing 150 without inhibiting axial movement of the drive ring 204 relative to the housing 150. The rotational locking assembly 206 may use more than one pin member 208 disposed around the circumference of the housing 150. An alternative example of a rotational locking assembly 206 may include a longitudinal raised ridge formed along the inside diameter of the outer housing's longitudinal bore. Thus, the profile 280 on the outside of the drive ring 204 can position about the longitudinal raised ridge. A corresponding groove along the outside of the failsafe ring 202 permits the positioning of the failsafe ring 202 in the housing 150 when the raised ridge is formed along the inside diameter of the housing 150.

Referring back to FIGS. 1A and 1B, the outside diameter of the failsafe ring 202 is substantially the same diameter as the inside diameter of the bottom portion 212 of the bore. The inside diameter of the failsafe ring 202 is larger than the outside diameter of the drive thread 214 of the top shaft 160, but smaller than the outside diameter of the drive ring 204. In this manner, the failsafe ring 202 permits axial movement of the top shaft 160 therethrough while providing a backstop for the drive ring 204. Further, the failsafe ring 202 can be a fusible ring made from a plastic-like material such as an acetal polyoxymethylene resin, also known as Delrin, or any other suitable material that is capable of accepting a load and melting or otherwise deforming, shearing, or changing due to a change in temperature or pressure such as the heat from a fire. When the failsafe ring 202 is made from a fusible material, it is capable of being liquefied by heat. Thus, the failsafe ring 202 fails in the event of a fire, thereby not providing the backstop for the drive ring 204 since the outside diameter of the drive ring 204 is sized to travel axially through the top portion 210 of the bore of the mechanical override 100.

In operation, rotation of the handwheel 200 rotates the top shaft 160 within the drive ring 204 in order to advance the top shaft 160 through the drive ring 204 across the length of the drive thread 214. Preferably the drive thread 214 is an Acme thread capable of functioning under loads. Further, the drive thread 214 preferably includes a small number of threads per inch, for example five, in order to decrease the work required to manually operate the actuator 101. The drive thread 214 permits unassisted rotation of the top shaft 160 with the handwheel 200. FIG. 1A shows the drive ring 204 positioned at a lowermost portion of the drive thread 214. With the drive ring 204 positioned at the lowermost portion of the drive thread 214, the drive ring 204 fails to limit upward axial movement of the top shaft 160 since the drive ring 204 lacks limiting contact with the backstop provided by the failsafe ring 202. Seating of the gate valve 102 in the closed position limits the upward axial movement of the top shaft 160. Thus, the bias of the spring 118 raises the top shaft 160 to an extended position providing a visual indication that the valve 102 is in the closed position.

FIG. 3 illustrates the gate valve 102 in the open position after an automatic operation of the actuator 101. Thus, the mechanical override 100 does not effect the automatic operation of the actuator 101 when the drive ring 204 is positioned at the lowermost portion of the drive thread 214 since the drive ring 204 can move downward with the top shaft 160 and other components of the actuator 101. Further, the top shaft 160 lowers to a retracted position in order to provide a visual indication that the valve 102 is in the open position.

Figure 4:
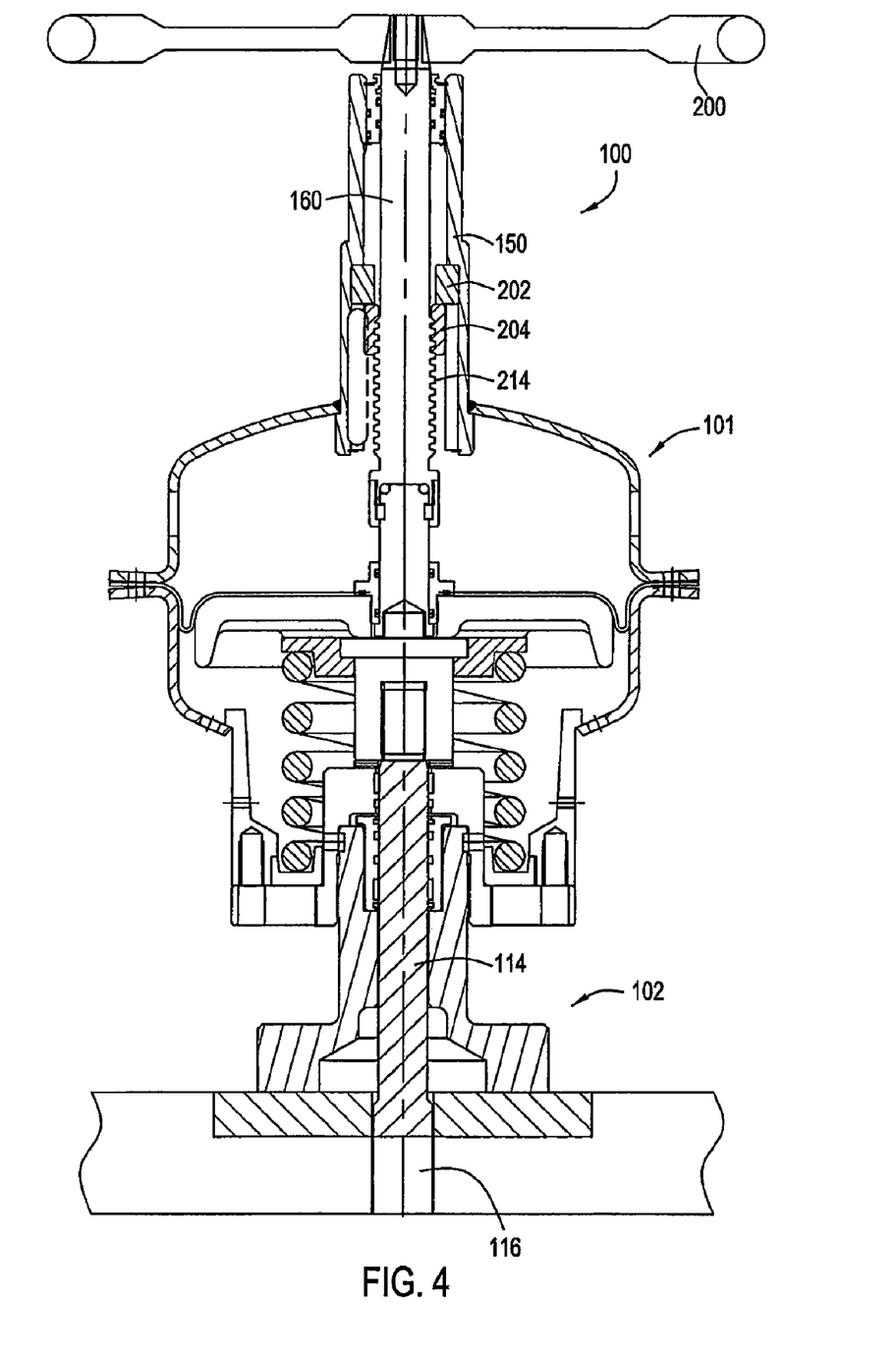
FIG. 4 is a sectional view of the gate valve in the open position after a manual operation of the mechanical override.

FIG. 4 illustrates the gate valve 102 in the open position after a manual operation of the actuator 101 using the mechanical override 100. In order to move the sliding gate 116 to the open position using the mechanical override 100, an operator manually turns the handwheel 200 to provide rotation to the top shaft 160. As the top shaft 160 rotates, the top shaft 160 advances through the drive ring 204 to an upper portion of the drive thread 214. During the manual operation, the failsafe ring 202 provides the backstop that prevents the drive ring 204 from moving relative to the housing 150. Thus, the manual rotation of the handwheel 200 mechanically advances the top shaft 160 through the housing 150 in order to either directly or indirectly axially move the valve stem 114 in order to place the valve 102 in the open position. Further, the top shaft 160 lowers during the manual operation to a retracted position in order to provide a visual indication that the valve 102 is in the open position.

Figure 5:
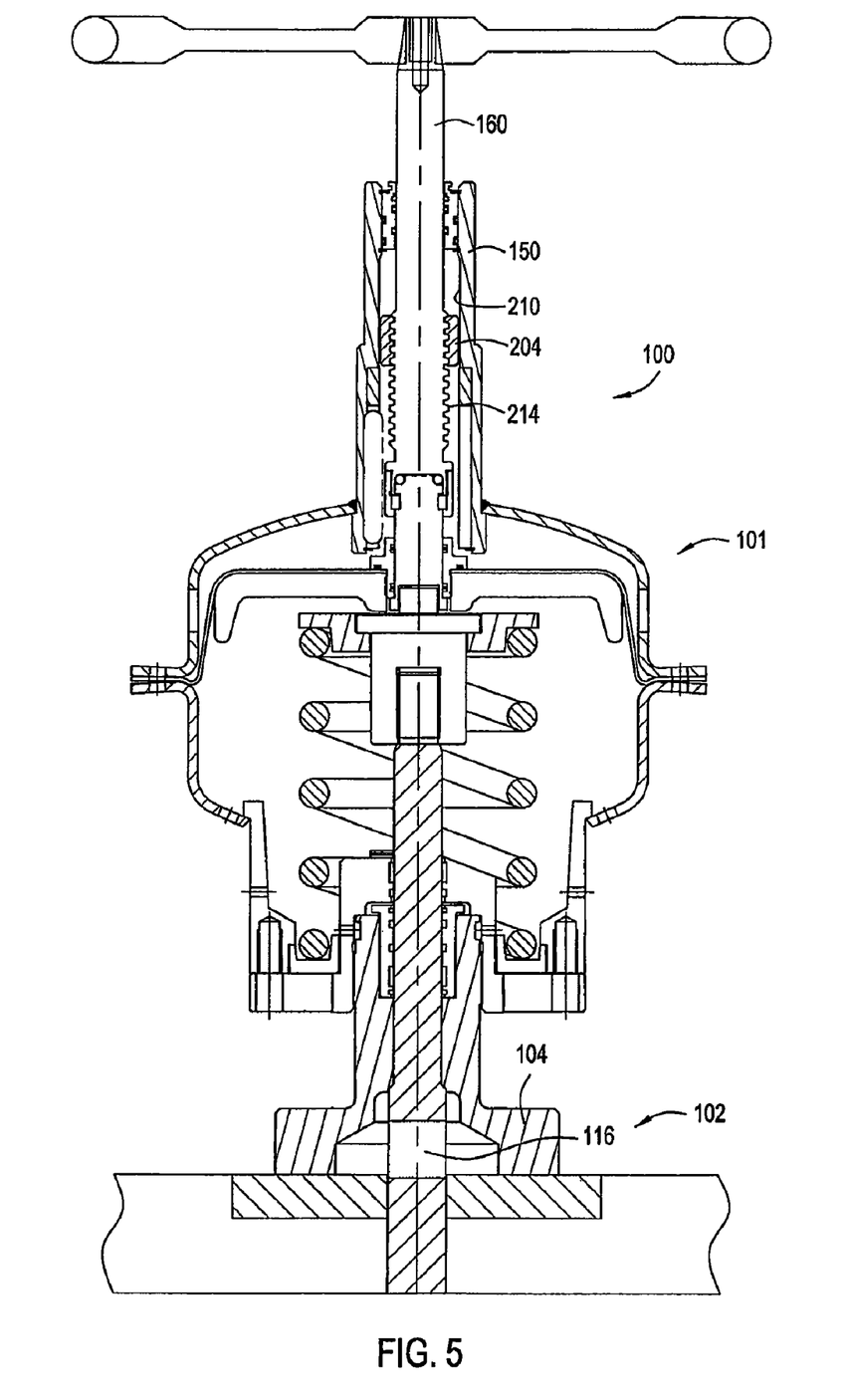
FIG. 5 is a sectional view of the gate valve in a closed position after a failsafe operation of the mechanical override.

FIG. 5 shows the gate valve 102 in a closed position after a failsafe operation of the mechanical override 100. As shown, the drive ring 204 stays positioned at the upper portion of the drive thread 214 which is normally associated with the manual operation of the valve 102 to the open position as discussed in FIG. 4. However, the failsafe ring 202 (not shown) melts in the failsafe operation. Therefore, lack of the backstop allows the drive ring 204 to pass through the upper bore 210 of the housing 150 of the mechanical override 100 during the failsafe operation. This places the valve 102 in the closed position and provides a visual indication of this position since the top shaft 160 is in the extended position.

Referring back to FIGS. 1A and 1B, a coupling assembly 158 prevents longitudinal separation between a retaining nut 162 secured to the operator member 112 and the top shaft 160 of the mechanical override 100 while isolating rotational movement of the top shaft 160 from the actuator 101 and the gate valve 102. The coupling assembly 158 includes an intermediate shaft 156, a female coupler 164, a split retaining ring 166, and ball bearings 168. The intermediate shaft 156 rotates within the retaining nut 162, thereby aiding in eliminating transmission of torque to the valve stem 114, the sliding gate 116, and/or components of the actuator 101 when using the mechanical override 100. Seals 170 seal an annular area between the intermediate shaft 156 and the retaining nut 162. The intermediate shaft 156 preferably is large enough in diameter to prevent bearing and buckling stresses when loaded by the mechanical override 100. A large bottom shoulder 172 on the intermediate shaft 156 contacts the retaining nut 162 and prevents the intermediate shaft 156 from moving axially relative to the operator member 112.

The split retaining ring 166 includes two half sections positioned within a profile 174 adjacent the top end of the intermediate shaft 156. The split retaining ring 166 has an outside diameter greater than the outside diameter of the intermediate shaft 156 such that a bottom shoulder 176 of the female coupler 164 engages the split retaining ring 166 to prevent the female coupler 164 from axially sliding past the split retaining ring 166. The opposite end of the female coupler 164 threads to an externally threaded end 178 of the top shaft 160. Ball bearings 168 positioned around the top surface of the intermediate shaft 156 provide contact with a bottom concave surface 180 of the top shaft 160. In this manner, the top shaft 180 freely rotates relative to the intermediate shaft 156 further eliminating transmission of torque to the valve stem 114, the sliding gate 116, and/or components of the actuator 101 when using the mechanical override 100.

The mechanical override 100 includes a top seal cartridge 250 that can be removed for replacement as a single unit without disassembling the actuator 101 or the mechanical override 100. The top seal cartridge 250 is preferably formed of a plastic-like material such as Delrin and is held in place by at least one retainer ring 252 which is preferably stainless steel. Accessibility to the retainer ring 252 without disassembly of the actuator 101 permits removal of the retainer ring 252 from the top of the housing 150, thereby allowing removal and replacement of the top seal cartridge 250. The top seal cartridge 250 contains dual reciprocating top shaft seals 256 and dual static seals 258 to ensure seal integrity and long life. The top seal cartridge 250 incorporates rod wiper 254 to keep a shaft sealing region therebelow clean of dirt, grease, and other contaminants for longer life of the seals 256. The rod wiper 254 is preferably made from Molythane 90. These and other seals may be T-seals or other substantially elastomeric seals, such as O-ring seals.

Figure 6:
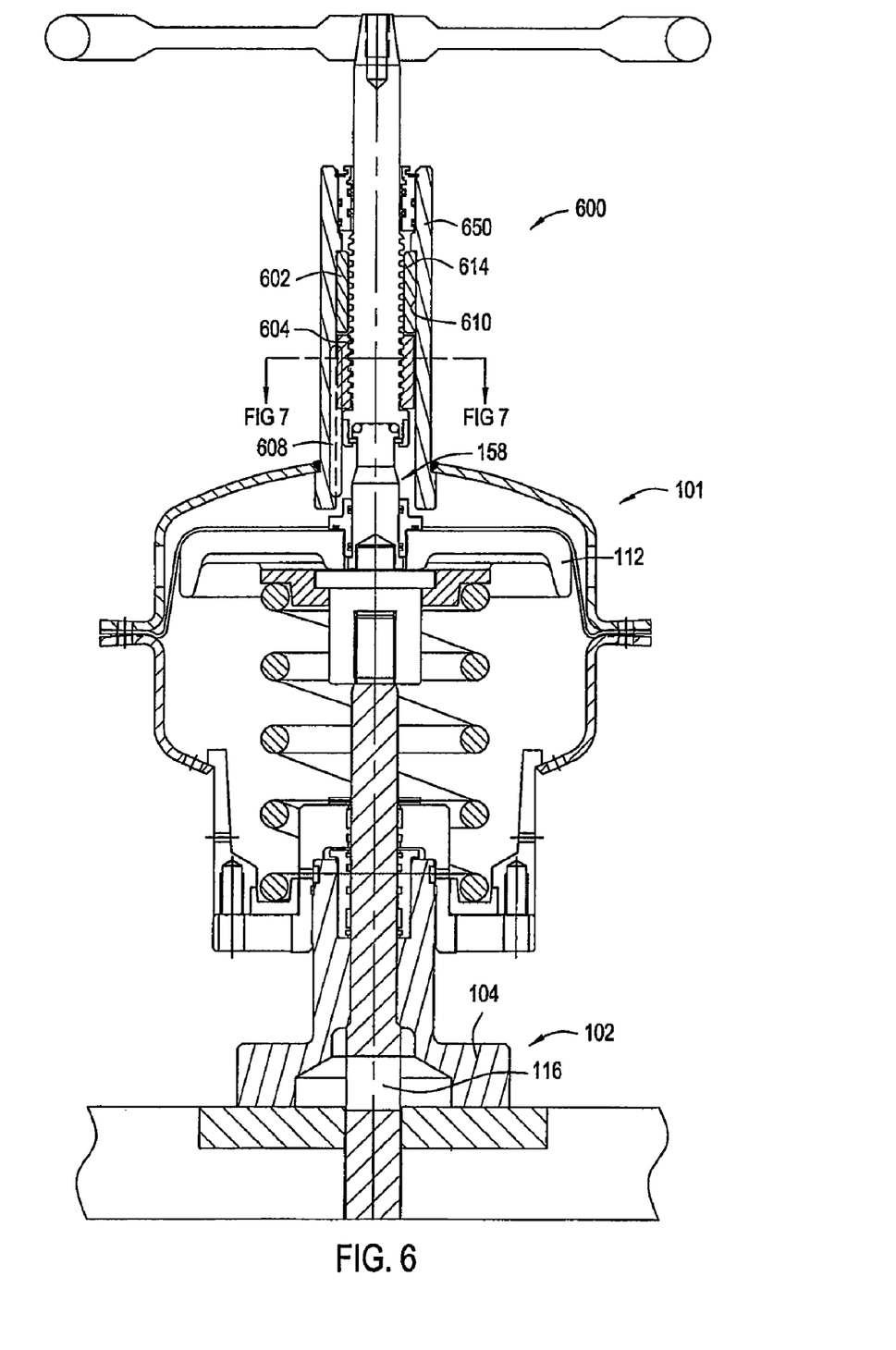
FIG. 6 is a sectional view of a gate valve coupled to an actuator having another embodiment of a mechanical override.
Figure 7:
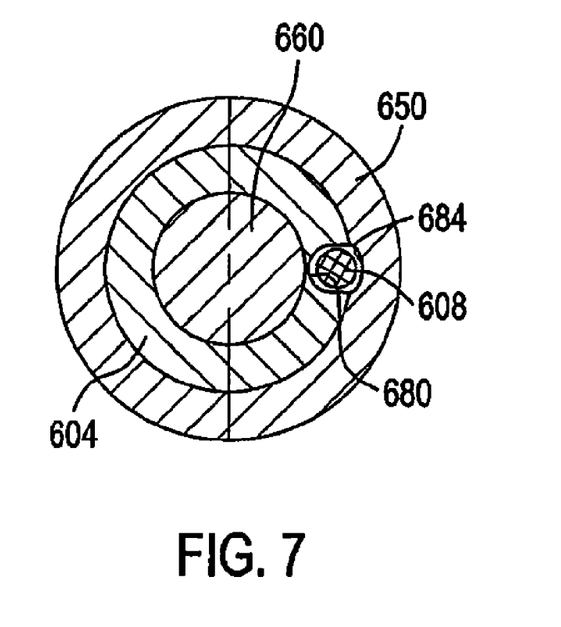
FIG. 7 is a cross sectional view of the mechanical override along section line 7-7 in FIG. 6.

FIG. 6 illustrates a gate valve 102 coupled to an actuator 101 having another embodiment of a mechanical override 600. The actuator 101 includes a coupling assembly 158 attached to an operator member 112 as described in FIG. 1A. The mechanical override 600 shown in FIG. 6 includes a bore 610 through an outer housing 650 that has substantially one inside diameter in which an insert or failsafe ring 602 and a drive ring 604 are positioned within. The failsafe ring 602 is located at a top portion of the housing 650 where it contacts a shoulder 614. FIG. 7 is a cross sectional view that illustrates the drive ring 604 rotationally locked to the housing 650. Interference between a pin member 608 and corresponding profiles 684, 680 in the housing 650 and the drive ring 604 provides the rotational locking while permitting axially movement of the drive ring 604. In this manner, the mechanical override 600 operates manually and automatically in the same manner as the mechanical override 100 described in FIG. 1A. However, the failsafe ring 602 must be sufficiently long such that when the failsafe ring 602 melts in a failsafe operation that the drive ring 604 travels through the portion of the bore 610 that was previously occupied by the failsafe ring 602 to move the position of the gate valve 102 from the open position to the closed position.

Figure 8:
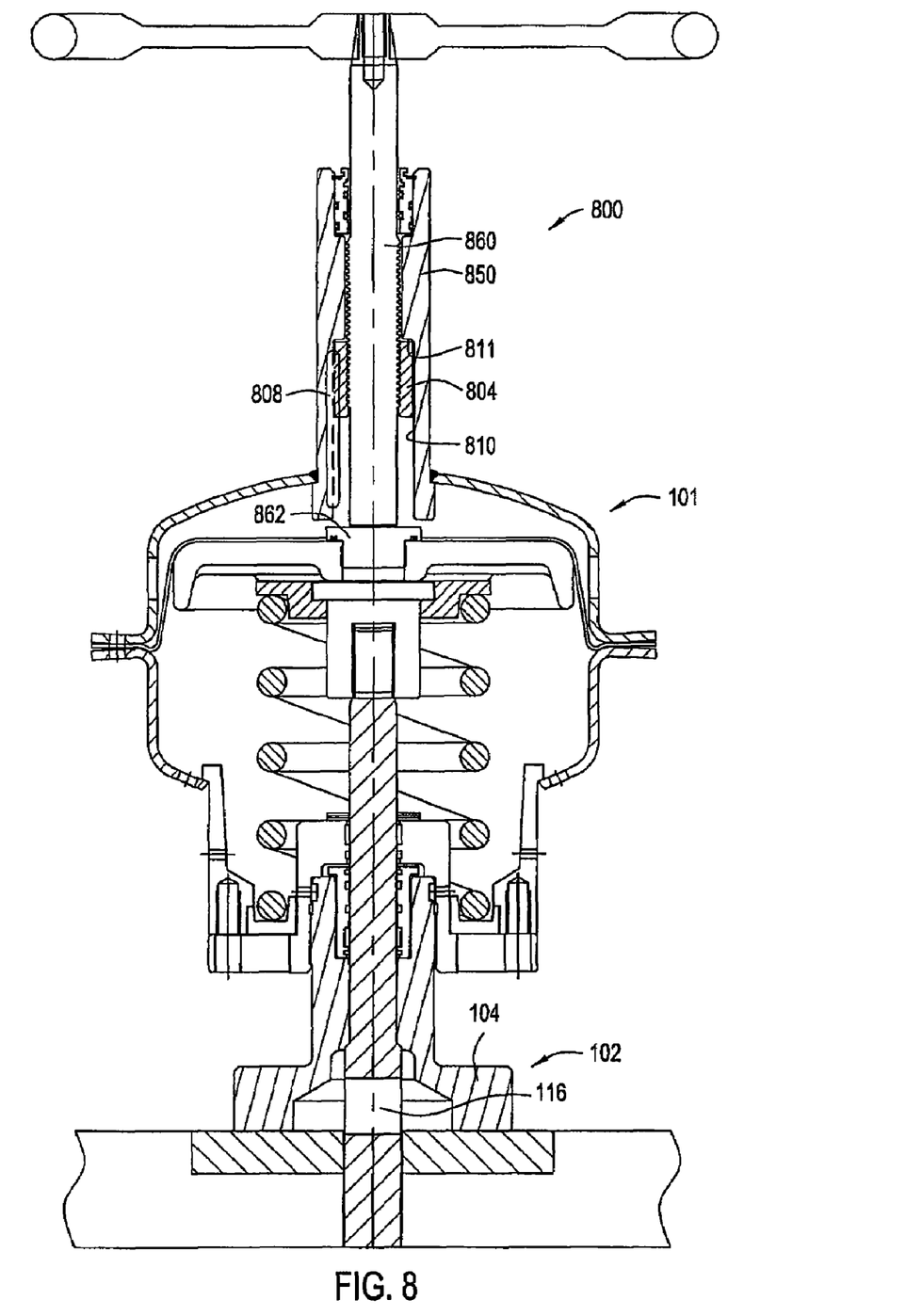
FIG. 8 is a sectional view of a gate valve coupled to an actuator having another embodiment of a mechanical override.

FIG. 8 is a sectional view of a gate valve 102 coupled to an actuator 101 having a mechanical override 800. The mechanical override 800 is shown without a failsafe ring. Thus, the mechanical override 800 does not provide a failsafe operation during the manual operation of the mechanical override 800. Without the failsafe ring, a shoulder 811 formed in a bore 810 of an outer housing 850 of the mechanical override 800 provides a backstop for a drive ring 804. A pin member 808 keys the drive ring to the housing 850. Therefore, the mechanical override 800 provides the ability for a manual operation of the actuator 101 and permits visual identification of the position of the gate valve 102 in either manual or automatic operation based on whether the top shaft 860 is in an extended or retracted position.

The mechanical overrides as described herein have been described as an integral member of the actuator 101. However, the mechanical overrides can be a separate assembly that couples to an exterior portion of the actuator 101. For example, the mechanical overrides may thread to a male connector located on a top of the cover 108 of the actuator 101.

Further, alternative embodiments do not require the coupling assembly connecting the top shaft with the operator member 112. In this manner, the top shaft of the mechanical override contacts and applies force directly to a portion of the actuator 101 such as the intermediate shaft or the operator member 112 depending on the type of actuator used. For example, FIG. 8 illustrates the top shaft 860 contacting a solid retaining nut 862. However, the solid retaining nut 862 may require a separate locking device (not shown) to prevent the retaining nut 862 from unthreading from the operator member 112 since the top shaft 860 rotates during the manual operation of the mechanical override 800. Alternatively, other known rotation isolation means may be provided to prevent transference of the rotation of the top shaft to other components within the actuator 101 and the gate valve 102.

While the foregoing is directed to embodiments of the present invention, other and further embodiments of the invention may be devised without departing from the basic scope thereof, and the scope thereof is determined by the claims that follow.

The invention claimed is:

1. A mechanical override for a valve, comprising:
   a valve actuator:
   an outer housing coupled to the valve actuator, the outer housing having a longitudinal bore therethrough;
   a drive shaft extending through the longitudinal bore, wherein the drive shaft is rotatable to impart axial movement to the drive shaft; and
   a rolling element bearing mechanism that isolates rotational movement of the drive shaft from a valve stem of a valve, wherein the valve stem and the drive shaft are aligned longitudinally with the axial movement of the drive shaft transferable to the valve stem for moving the valve between a first position and a second position, wherein the bearing mechanism is part of a coupling assembly that prevents longitudinal separation between the drive shaft and an operational part of the valve actuator.

2. The mechanical override of claim 1, further comprising a handwheel coupled to the drive shaft and turnable to rotate the shaft.

3. The mechanical override of claim 1, wherein the bearing mechanism comprises ball bearings.

4. The mechanical override of claim 1, wherein the bearing mechanism comprises:
   an intermediate shaft coupled to an operator member of the actuator;
   ball bearings positioned between a bottom load surface of the drive shaft and a top surface of the intermediate shaft; and
   a coupler connecting the intermediate shaft to the drive shaft, wherein the coupler is capable of rotation about the intermediate shaft.

5. A mechanical override for a valve, comprising:
   a valve actuator;
   an outer housing coupled to the valve actuator, the outer housing having a longitudinal bore therethrough;
   an internally threaded drive ring;
   a rotational locking assembly that prevents rotation of the drive ring while permitting axial movement of the drive ring within the longitudinal bore;
   a rotatable drive shaft extending through the longitudinal bore, wherein a thread is located on an external portion of the shaft, the shaft configured to be manually rotated through the drive ring that is prevented from rotation to impart axial movement to the drive shaft capable of moving a valve between a first position and a second position; and a bearing mechanism with a rolling element that isolates rotational movement of the drive shaft from a portion of the valve actuator that receives the axial movement.

6. The mechanical override of claim 5, further comprising a handwheel coupled to the drive shaft and turnable to rotate the shaft.

7. The mechanical override of claim 5, wherein the rolling element comprises a ball bearing.

8. The mechanical override of claim 5, wherein the bearing mechanism is part of a coupling assembly that prevents longitudinal separation between the drive shaft and an operational part of the actuator.

9. The mechanical override of claim 5, wherein the bearing mechanism comprises:
   an intermediate shaft coupled to an operator member of the actuator;
   ball bearings positioned between a bottom load surface of the drive shaft and a top surface of the intermediate shaft; and
a coupler connecting the intermediate shaft to the drive shaft, wherein the coupler is capable of rotation about the intermediate shaft.

10. A mechanical override for a valve, comprising:
   a valve actuator;
   an outer housing coupled to the valve actuator, the outer housing having a longitudinal bore therethrough;
   a drive shaft extending through the longitudinal bore, wherein a thread is located on an external portion of the drive shaft for rotation of the drive shaft through the bore to impart axial movement to the drive shaft capable of moving a valve between a first position and a second position; and
   a coupling assembly coupling the drive shaft to a member of the valve actuator, the coupling assembly comprising a bearing mechanism that isolates rotational movement of the drive shaft from the member, wherein the bearing mechanism comprises:
      an intermediate shaft coupled to an operator member of the valve actuator;
      ball bearings positioned between a bottom load surface of the drive shaft and a top surface of the intermediate shaft; and
      a coupler connecting the intermediate shaft to the drive shaft, wherein the coupler is capable of rotation about the intermediate shaft.

11. A mechanical override for a valve, comprising:
a valve actuator;
an outer housing coupled to the valve actuator, the outer housing having a longitudinal bore therethrough;
a drive shaft extending through the longitudinal bore, wherein a thread is located on an external portion of the drive shaft for rotation of the drive shaft through the bore to impart axial movement to the drive shaft, the drive shaft capable of moving a valve between a first position and a second position; and
a coupling assembly coupling the drive shaft to a member of the valve actuator, the coupling assembly comprising a bearing mechanism that isolates rotational movement of the drive shaft from the member, wherein the coupling assembly prevents longitudinal separation between the drive shaft and the member.

* * * * *